UNITED STATES PATENT OFFICE.

MARSHALL P. SMITH, OF BALTIMORE, MARYLAND.

IMPROVEMENT IN DRYING TOMATOES.

Specification forming part of Letters Patent No. 137,327, dated April 1, 1873; application filed March 21, 1872.

*To all whom it may concern:*

Be it known that I, MARSHALL P. SMITH, of the city of Baltimore and State of Maryland, have invented an Improved Process for Drying and Preserving Tomatoes, of which the following is a specification:

This process consists in first removing a portion of the water from tomatoes by pressure, and then wholly or partially evaporating the residue.

The water in apples is chemically combined or saturated with the saccharine and other constituents of the fruit, and when expressed it appears in the form of cider. The water in tomatoes, on the other hand, is but slightly, if at all, combined, but is held in mechanical suspension in the fruit, and when expressed, flows out as water, almost colorless, and almost tasteless.

Tomatoes contain a larger percentage of water than almost any other vegetable, and require so much time to dry them that it is difficult by any of the old methods to preserve the natural taste and sweetness of the vegetable unaltered. By this improvement I am enabled to reduce the time required to dry them more than one-half, and at the same time to greatly improve the quality of the dried product.

The method of procedure which I prefer to use in carrying out this invention is as follows: The tomatoes are first scalded to loosen and remove the skins. They are then put into bags and placed in suitable presses, separated by boards and left under a weight until a considerable portion of the water has been discharged. They are then removed to a screw or hydraulic press until the required consistency is obtained. They are then removed from the bags, spread upon trays, and dried in an evaporating-chamber.

Although I have found the above to be the most simple and economical mode of procedure, I do not confine myself to it exclusively, but reserve the right to use any kind of pressure in removing the water and to effect the subsequent drying by natural or artificial heat.

The tomatoes may either be entirely deprived of moisture, or left in a "leathery" condition, as desired.

I am aware that the plan of compressing tomatoes, after they have been dried, into cakes or blocks, with the view of reducing their bulk, is not new, and such I do not claim; but What I do claim as my invention, is—

The within-described process of drying and preserving raw tomatoes, by submitting them first to pressure to remove a portion of the water which they contain, and then partially or wholly evaporating the residue, substantially as set forth.

MARSHALL P. SMITH.

Witnesses:
 W. W. WOOLFORD,
 JAS. W. KIRKMAN.